(12) United States Patent
Terry et al.

(10) Patent No.: US 8,877,907 B2
(45) Date of Patent: Nov. 4, 2014

(54) MOLECULARLY IMPRINTED POLYMERS

(75) Inventors: Tracy J. Terry, Albuquerque, NM (US);
Andrew F. Mason, Silver Spring, MD (US); Carl A. Marrese, Fayetteville, PA (US)

(73) Assignee: The Johns Hopkins University, Baltimore, MD (US)

( * ) Notice: Subject to any disclaimer, the term of this patent is extended or adjusted under 35 U.S.C. 154(b) by 706 days.

(21) Appl. No.: 13/152,342

(22) Filed: Jun. 3, 2011

(65) Prior Publication Data
US 2011/0303611 A1 Dec. 15, 2011

Related U.S. Application Data

(60) Provisional application No. 61/352,005, filed on Jun. 7, 2010.

(51) Int. Cl.
| | | |
|---|---|---|
| C08B 37/08 | (2006.01) | |
| C02F 1/42 | (2006.01) | |
| C02F 1/28 | (2006.01) | |
| C08F 251/00 | (2006.01) | |
| C02F 101/10 | (2006.01) | |
| C02F 101/20 | (2006.01) | |

(52) U.S. Cl.
CPC ........... *C02F 1/285* (2013.01); *C02F 2101/105* (2013.01); *C08B 37/003* (2013.01); *C02F 2101/103* (2013.01); *C02F 2101/20* (2013.01); *C02F 1/42* (2013.01); *C08F 251/00* (2013.01); *Y10S 210/906* (2013.01); *Y10S 210/907* (2013.01)
USPC ............. 536/20; 210/683; 210/192; 210/906; 210/907

(58) Field of Classification Search
USPC ................... 210/906–907, 683, 192; 536/20
See application file for complete search history.

(56) References Cited

U.S. PATENT DOCUMENTS

| | | | |
|---|---|---|---|
| 5,340,483 A | 8/1994 | Payne et al. | |
| 6,379,599 B1 * | 4/2002 | Vaidya et al. | ................. 264/220 |
| 6,582,971 B1 * | 6/2003 | Singh et al. | ................... 436/518 |
| 6,749,811 B2 | 6/2004 | Murray | |
| 7,279,096 B2 | 10/2007 | Murray | |
| 7,943,597 B2 * | 5/2011 | Lewis et al. | ..................... 514/55 |
| 7,943,697 B2 * | 5/2011 | Simon | ........................... 524/731 |
| 2003/0054949 A1 | 3/2003 | Chang et al. | |
| 2003/0059346 A1 | 3/2003 | Murray | |
| 2003/0129730 A1 * | 7/2003 | Chenite et al. | ............. 435/253.6 |

(Continued)

FOREIGN PATENT DOCUMENTS

| | | |
|---|---|---|
| CN | 101298039 | 1/2008 |
| DE | 19528524 | 2/1997 |

(Continued)

OTHER PUBLICATIONS

Rozman, M., "Modelling of the gas-phase phosphate group loss and rearrangement in phosphorylated peptides," J Mass Spectrom. Sep. 2011;46(9):949-55. doi: 10.1002/jms.1974.*

(Continued)

*Primary Examiner* — Chester Barry
(74) *Attorney, Agent, or Firm* — Noah J. Hayward

(57) ABSTRACT

Disclosed is a cross-linked molecularly imprinted polymer including cross-linked chitosan having selective binding sites for phosphate ions, phosphate containing molecules, or a combination of both.

21 Claims, 3 Drawing Sheets

(56) References Cited

U.S. PATENT DOCUMENTS

| | | |
|---|---|---|
| 2005/0276781 A1 | 12/2005 | Ross et al. |
| 2008/0038832 A1 | 2/2008 | Sellergren et al. |
| 2008/0264868 A1 | 10/2008 | Murray et al. |
| 2009/0253652 A1 | 10/2009 | Lewis et al. |
| 2009/0269399 A1 | 10/2009 | Lewis et al. |
| 2009/0311324 A1 | 12/2009 | Steinfeld et al. |
| 2010/0098731 A1* | 4/2010 | Chen et al. .................. 424/400 |
| 2011/0015373 A1 | 1/2011 | Sellergren et al. |

FOREIGN PATENT DOCUMENTS

| | | |
|---|---|---|
| JP | 2007050333 | 3/2007 |
| WO | 9701629 | 1/1997 |
| WO | 0047177 | 8/2000 |
| WO | 0132751 | 5/2001 |
| WO | 2005027885 | 3/2005 |
| WO | 2006061336 | 6/2006 |
| WO | 2006050314 | 11/2006 |
| WO | 2007108770 | 9/2007 |
| WO | 2007115973 | 10/2007 |
| WO | 2009122400 | 10/2009 |

OTHER PUBLICATIONS

A. Kugimiya, et al., "Preparation of molecularly imprinted polymers with thiourea group for phosphate," Analytica Chimica Acta 564 (Mar. 9, 2006), 179-183.

* cited by examiner

MOLECULARLY IMPRINTED POLYMERS

CROSS-REFERENCE TO RELATED APPLICATIONS

This application claims the benefit of prior filed U.S. Provisional Application No. 61/352,005, filed Jun. 7, 2010, the contents of which are incorporated by reference herein.

BACKGROUND OF THE INVENTION

1. Field of the Invention

The present invention generally relates to molecularly imprinted materials, and, more particularly, to a cross-linked molecularly imprinted polymer material having selective binding sites for phosphate ions, phosphate containing molecules, or a combination of both.

2. Description of the Related Art

The concept of molecularly imprinting molecules may be traced to suppositions about the operation of the human immune system made by Stuart Mudd, circa 1930, and Linus Pauling, circa 1940. Mudd proposed the idea of complementary structures, by which a specific antibody attaches to a specific target or antigen because the shape of the antibody provides a cavity for receiving the shape of the antigen. The "lock and key" analogy used in explaining the action of enzymes is similarly explained, where enzymes form a "lock" for a particular chemical "key". Pauling postulated on how an otherwise nonspecific antibody molecule could be reorganized into a specific binding molecule. He reasoned that shape specificity was obtained when the body assembled a new protein complement, i.e., antibody, by using a target antigen as a template in arranging the complementary shape of an antibody. A nonspecific molecule can thus be shaped to the contours of a specific target. When the target is removed, the shape of the target is retained, which provides an antibody with a propensity to rebind the antigen. This process is known as molecular imprinting.

Molecular imprinting is used to create specific recognition sites in substrate materials, for example, polymeric organic materials. Known molecular imprinting techniques involve crosslinking materials in the presence of a functional monomer or mixture of monomers. Reactive or coordination sites on a target molecule or complex interact with a complementary site on a functional monomer during the polymerization process, either covalently or by other interactions such as ionic, hydrophobic or hydrogen bonding. Upon removal of the target molecule from the substrate, a "cavity" or recognition site is formed for receiving a similarly shaped molecule.

Synthetic production of molecularly imprinted polymers with selective binding sites for a specific target cation is achieved by providing polymers with cavities lined with complexing groups or "ligands" arranged to match the charge, coordination number, coordination geometry, and size of the target cation. Molecularly imprinted polymers with selective binding sites for anions are made in a similar manner to cations, but typically employ a trapped metal ion that has a high affinity for the target anion. Cavity-containing polymers may be produced using a specific ion as a template around which monomeric complexing ligands will be self-assembled and polymerized. Complexing ligands contain functional groups known to form stable complexes with the specific target ion and less stable complexes with other ions.

A method of molecular imprinting referred to as solution polymerization results in the formation of imprinted sites that are completely encased within the polymer. To access those sites, the polymer must be ground to produce particles that have exposed sites. The grinding process, however, produces irregularly shaped particles and also damages the sites by adversely affecting selectivity and activity. As an alternative method to increase accessibility to the imprinted sites is by using porogens, which are typically inert solvents, which when removed, create pores to allow access to the created binding sites. Removal of the porogen solvent adversely affects the structural integrity of the polymer, leading to deformation of the sites and loss in specificity and activity. Lyophilization (or freeze drying) is another way to create a highly porous polymer that allows access to imprinted sites.

Molecular imprinting is useful in a variety of applications. For example, the ability to remove a specific component from its environment applies to both environmental and medical fields. According to the Environmental Protection Agency, approximately 40 percent of the waterways in the United States still do not meet water quality goals and about half of the 2000 major watersheds have water quality problems. Phosphorus (as phosphate) and nitrogen (as nitrate and ammonia) are major pollutants that enter our waterways as runoff from sewage plants and farmland, posing a clear threat to drinking water and aquatic life. As the nitrates increase in the environment, they act as plant nutrients, and cause an increase in plant growth. As plant material dies and decomposes, dissolved oxygen levels decrease. An increase in nitrates may be followed by an increase in phosphates. As phosphates increase and the growth of aquatic plants is encouraged, algal blooms can occur. With an increase in algal growth and decomposition, the dissolved oxygen levels further decrease, causing the death of fish and disruption to the ecosystem. Nitrogen and phosphorous nutrients both cause increases in plant growth, algal blooms, and decreases in oxygen levels. Presently, there are existing methods that may remove phosphate but typically require adding large amounts of chemicals to water in order to precipitate insoluble phosphate salts (iron phosphate or aluminum phosphate) out of solution.

There remains a need for an effective and easy to use method and apparatus for removing phosphate ions from a liquid medium. There is also a need for improved methods for removing phosphate ion that are environmentally-friendly.

SUMMARY OF THE INVENTION

In accordance with one embodiment of the present invention, there is provided a cross-linked molecularly imprinted polymer comprising cross-linked chitosan having selective binding sites for phosphate ions, phosphate containing molecules, or a combination of both.

In accordance with a second embodiment of the present invention, there is provided a filter for removing phosphate from a liquid medium comprising a cross-linked chitosan having selective binding sites for phosphate ions, phosphate containing molecules, or a combination of both.

In accordance with a third embodiment of the present invention, there is provided a process for preparing a cross-linked molecularly imprinted polymer comprising (a) providing a reaction product of chitosan and a phosphate template molecule in a polar organic solvent; (b) crosslinking the reaction product of step (a) with a crosslinking agent; and (c) removing the phosphate template molecule to provide a cross-linked molecularly imprinted polymer comprising cross-linked chitosan having selective binding sites for phosphate ions, phosphate containing molecules, or a combination of both.

In accordance with a fourth embodiment of the present invention, there is provided a process for preparing a cross-linked molecularly imprinted polymer comprising (a) providing an aqueous solution including at least chitosan, a phosphate template molecule and a blocked crosslinking agent in an aqueous solvent; (b) removing the aqueous solvent from the solution to form a solid; (c) heating the solid to a temperature sufficient to unblock the blocked crosslinking agent and form a cross-linked chitosan with the phosphate template molecule bound thereto; and (d) removing the phosphate template molecule to provide a cross-linked molecularly imprinted polymer comprising cross-linked chitosan having selective binding sites for phosphate ions, phosphate containing molecules, or a combination of both.

In accordance with a fifth embodiment of the present invention, there is provided a method for selectively binding and separating phosphate anions from a liquid medium comprising (a) providing a cross-linked molecularly imprinted polymer comprising cross-linked chitosan having selective binding sites for phosphate ions, phosphate containing molecules, or a combination of both; and (b) contacting the cross-linked molecularly imprinted polymer with the liquid medium, wherein any phosphate ions, phosphate containing molecules, or a combination of both present in the liquid medium are selectively removed from the liquid medium and sequestered in the cross-linked molecularly imprinted polymer.

The cross-linked molecularly imprinted polymer of the present invention advantageously removes phosphate ions, phosphate containing molecules, or a combination of both from a liquid medium such as industrial wastewater by way of cross-linked chitosan having selective binding sites for phosphate ions, phosphate containing molecules, or a combination of both.

BRIEF DESCRIPTION OF THE DRAWINGS

Various embodiments are described below with reference to the drawings wherein.

DETAILED DESCRIPTION OF PREFERRED EMBODIMENT(S)

Figure 1A:
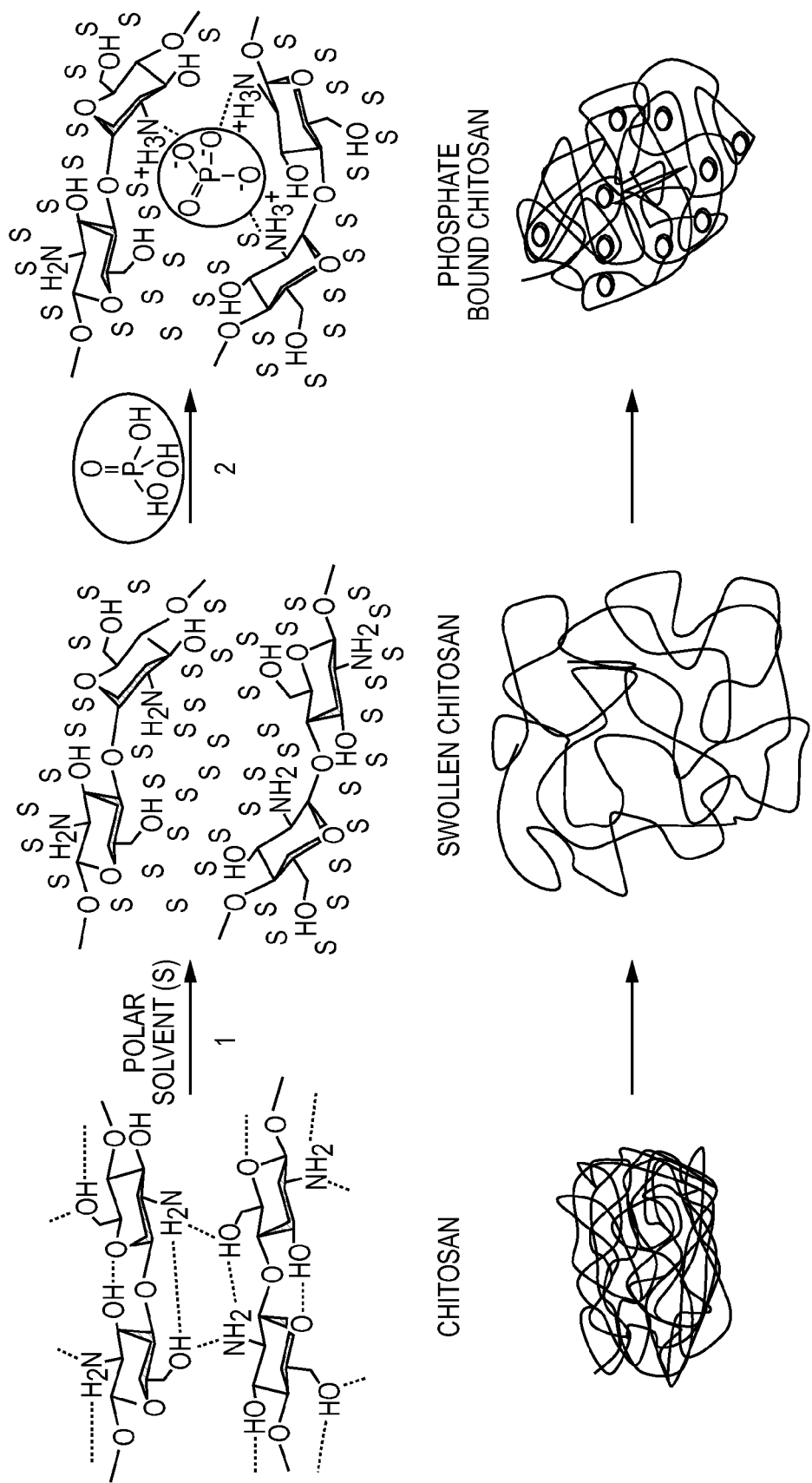
FIGS. 1A and 1B illustrate a reaction scheme for preparing a cross-linked molecularly imprinted polymer according to one embodiment of the present invention.

The present invention is directed to a cross-linked molecularly imprinted polymer for removing phosphate ions, phosphate containing molecules, or a combination of both present in a liquid medium, e.g., drinking water, lakes, streams, industrial effluent, mine waste streams, etc, employing cross-linked chitosan having selective binding sites for phosphate anions. The present invention uses techniques of molecularly imprinting polymers for providing a selective binding site in an ion exchange resin for receiving cations and anions. Ion exchange resin systems of the present invention can include a plurality of the same or different beads each having a porous structure of at least a cross-linked molecularly imprinted polymer ("MIP") having molecular sized cavities adapted to selectively receive and bind specific inorganic ion(s) that are present in the aqueous medium. The cavities advantageously direct the specific inorganic ion(s), i.e., phosphate anions, to a selective binding site. Transport of phosphate ions, phosphate containing molecules, or a combination of both through the ion exchange resin system of the present invention can be used for separating, removing, or recovering the captured phosphate ions and/or phosphate containing molecules, and is often driven by environmental, economic, health, and medical concerns.

Molecularly imprinted polymers (MIPs) can be made by building an imprinting complex of the phosphate ions and/or phosphate containing molecules and associated attached binding molecules that possess the ability to be incorporated into a polymer, e.g. via a polymerizable group or an appropriate reactive functional group. The complex is usually dissolved in a larger amount of other polymerizable molecules. The bulk of the other molecules of the polymer are made with crosslinking monomers. These molecules have two places to bind to the polymer chain to form a rigid three-dimensional structure. The crosslinkers are generally necessary to hold the complexing molecules or ligands in place after the target molecule (also called a "template", "analyte" or "taggant") is removed. Once removed, the ligands remain fixed in place to form cavities which are specifically sized and oriented to receive the target molecule, i.e., phosphate ions, phosphate containing molecules, or a combination of both.

It will be appreciated by those skilled in the art that a goal in making a molecularly imprinted polymer is to use an ion imprinting complex that will survive the polymerization process and leave behind a selective binding site when the ion species is removed from the ion imprinting complex. In forming a complex, ligands must be chosen that exhibit sufficiently high affinities to resist dissociation. In addition, the polymerization process must provide sufficient rigidity to effect structural "memory" but be sufficiently flexible to allow removal of the ion.

The terms "molecularly imprinted polymer" and "MIP" as used herein refer to a polymer structure that includes complexing molecules or ligands which are imprinted to selectively bind to a specific ion whether or not such ions are present. The polymer structure has organized interactive moieties complementary to the spacing of binding sites on the target imprint inorganic ion. Interactive moieties can include functional groups or ligands. The geometrical organization of the interactive moieties imparts selective binding characteristics for the target inorganic ion within the molecularly imprinted polymer. The selective binding interactions refer to preferential and reversible binding exhibited by the MIP for the phosphate anions, as described herein.

The origins of molecularly imprinted molecules trace back to the notion of Linus Pauling that the body assembled a new protein complement (i.e., an antibody) by using the foreign intruder as a template. Although it was later determined that this is not how antibodies are selected in vivo, this template concept stimulated significant thought and research. Molecular imprinting creates specific recognition sites in materials, such as polymeric organic materials. Known molecular imprinting techniques involve crosslinking materials in the presence of a functional monomer or mixture of monomers. The template molecule interacts with a complementary portion of a functional monomer, either covalently or by other interactions such as ionic, hydrophobic or hydrogen bonding, so that recognition sites for the template molecule can be provided in the substrate material. The template molecule is then removed from the substrate to leave a "cavity" or recognition site. Pauling reasoned that shape specificity was obtained by using a target antigen to arrange the complementary shape of an antibody. Thus, a nonspecific molecule can be shaped to the contours of a specific target, and when the target is removed, the shape is maintained to give the antibody a propensity to rebind the antigen. This process is known as "molecular imprinting" or "templating."

The target or template molecule directs the positioning of the encapsulating molecule by the interactions that occur between certain sites on the target and complementary sites on the binding molecule. The sites that allow complementary associations are certain arrangements of atoms that exhibit an electrostatic attraction of a specific kind. These localized atomic arrangements are sometimes referred to as "functional groups." The functional groups on a molecule help to define the molecule's overall chemical properties. In general, the MIP should exhibit as closely as possible the reverse topology of the template molecule.

The cross-linked molecularly imprinted polymers (MIPs) of the present invention are made using chitosan. Chitosan is a derivative of chitin. Chitin is a natural fiber extracted from the shells of crustaceans such as shrimp, crab and lobster. In general, to prepare chitin, the ground shellfish exoskeletons are decalcified with dilute acid, deproteinated with dilute alkali and the resulting material is bleached or decolorized. By treating the chitin with hot concentrated alkali, some or all of the N-acetyl groups may be removed resulting in a modified carbohydrate, polyglucosamine or chitosan. It is a nontoxic, biocompatible and biodegradable natural polymer. It is a member of a class of biopolymers called hydrocolloids, but has atypical properties. While most hydrocolloids are neutral or negatively charged biopolymers, chitosan is positively charged. Its cationic nature in acid solution is ideal, as the positively charged chitosan is attracted to negatively charged surfaces.

In general, the weight percentage of chitosan in the MIP compounds of the present invention ranges from about 55% to about 95%. In one embodiment, the weight percentage of chitosan in the MIP compound is about 65% to about 75%.

Chitosan is usually dissolved in a larger amount of other polymerizable molecules. The bulk of the other molecules of the polymer are made with crosslinking monomers and the specific target compound. These molecules have two places to bind to the polymer chain to form a rigid three-dimensional structure. The crosslinkers are necessary to hold the displacement molecules having the taggant molecular structure, i.e., phosphate anions after the target molecule (also called a "template", "analyte" or "taggant") is removed.

It is worthy to note, that while specific target compounds are used to form the cross-linked molecularly imprinted polymers, the polymers may have a high affinity for a class of compounds that is substantially similar to the target compound. A molecularly imprinted polymer may bind a number of compounds that are similar in shape, charge density, geometry or other physical or chemical properties.

As used herein, the term "bind," "binding," "bond," "bonded," or "bonding" refers to the physical phenomenon of chemical species being held together by attraction of atoms to each other through sharing, as well as exchanging, of electrons or protons. This term includes bond types such as: ionic, coordinate, hydrogen bonds, covalent, polar covalent, or coordinate covalent. Other terms used for bonds such as banana bonds, aromatic bonds, or metallic bonds are also included within the meaning of this term.

As used herein, "reaction" is intended to cover single step and multi-step reactions which can be direct reactions of reactants to products or may include one or more intermediate species which can be stable or transient.

The choice of crosslinking agent will be dictated by the chemical (hydrophilicity, chemical stability, degree of crosslinking, ability to graft to other surfaces, interactions with other molecules, etc.) and physical (porosity, morphology, mechanical stability, etc.) properties desired for the polymer. The amounts of chitosan and crosslinking agent should be chosen to provide a cross-linked chitosan polymer exhibiting the desired structural integrity and hydrophilicity. The amounts can vary broadly, depending on the specific nature/reactivities of the core, monomer and crosslinking agent chosen as well as the specific application and environment in which the polymer will ultimately be employed. The relative amounts of each reactant can be varied to achieve desired concentrations of complexes in the polymer support structure. The degree of crosslinking may, however, affect the amount of flux, i.e., a lower degree of crosslinking may provide a higher flux. The degree of crosslinking herein can range from about 5% to about 95%.

Generally, the phosphate template molecules are incorporated into the cross-linked molecularly imprinted polymer prior to or during the crosslinking reaction. For example, in the case of chitosan, a phosphate template molecule is added to the mixture and will associate with the chitosan polymer through noncovalent bonding interactions with the amine functional groups, forming imprint sites with the polymer matrix. When crosslinking is complete, the target molecule is removed from the cross-linked molecularly imprinted polymer. See, e.g., FIGS. 1A and 1B. Removal of the phosphate template molecule leaves a cross-linked molecularly imprinted polymer having complementary molecular cavities that have specific binding affinity for phosphate anions. The phosphate template molecule may be dissociated from the binding site within the polymer in a manner that does not adversely affect the imprinted cavity. For example, where the phosphate template molecule is associated with the complex in a non-covalent manner, the non-covalently bound molecule is simply leached or washed out after polymerization.

Figure 1B:
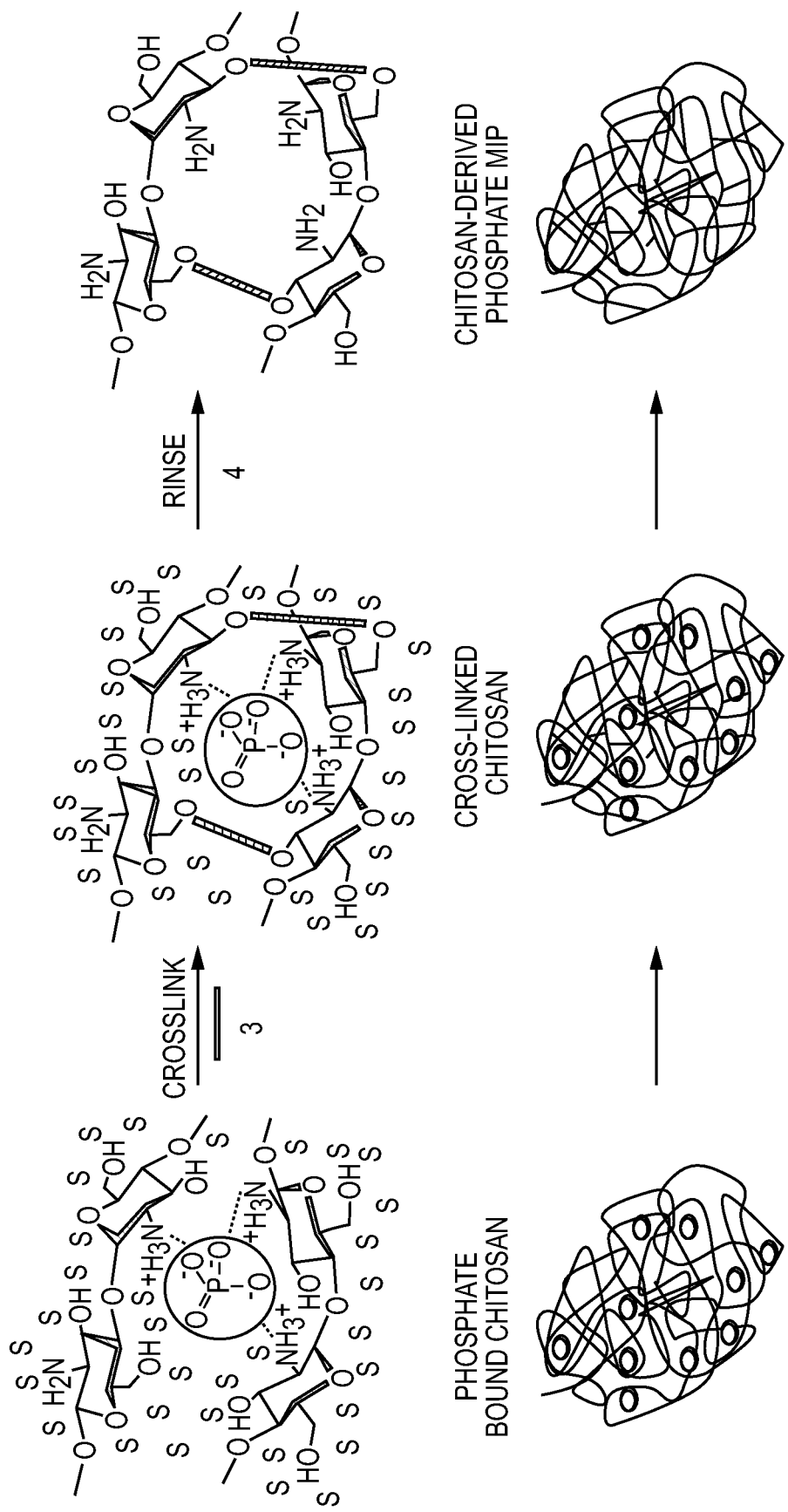

In one embodiment, a process for preparing a cross-linked molecularly imprinted polymer of the present invention is generally shown in FIGS. 1A and 1B. In general, the process includes (a) providing a reaction product of chitosan and a phosphate template molecule in a polar solvent; (b) crosslinking the reaction product of step (a) with a crosslinking agent; and (c) removing the phosphate template molecule to provide a cross-linked molecularly imprinted polymer comprising cross-linked chitosan having selective binding sites for phosphate ions, phosphate containing molecules, or a combination of both.

Step (a) includes providing a reaction product of chitosan and a phosphate template molecule in a polar solvent. Useful phosphate template molecules include any suitable inorganic or organic soluble phosphate. Representative examples of such suitable phosphates include phosphate, methyl phosphate, ethyl phosphate, phenyl phosphate, potassium dihydrogen phosphate ($KH_2PO_4$), sodium dihydrogen phosphate ($NaH_2PO_4$) and the like and mixtures thereof. Generally, the amount of phosphate template molecule employed will range from about 0.1 to about 2.0 grams of template molecule per gram of chitosan.

Suitable polar organic solvents include, but are not limited to, water, carboxylic acid polar solvents, e.g., acetic acid, halogenated hydrocarbon solvents, e.g., dichloromethane, chloroform, carbon tetrachloride, dichloroethane and the like; cyclic ether solvents, e.g., tetrahydrofuran, 1,4-dioxane, diisopropyl ether, methyl tertiary butyl ether, and the like; amide solvents, e.g., formamide, dimethylformamide, dimethylacetamide, hexamethylphosphoric triamide and the like; sulfoxides such as dimethyl sulfoxide, sulfolane and the like; as well as other polar organic solvents and mixtures thereof. Preferred solvents for use herein are water, acetic acid, dichloromethane, tetrahydrofuran, dimethylformamide, acetonitrile, dimethyl sulfoxide and mixtures thereof. Generally, the amount of polar solvent employed in the reaction can range from about 10 mL to about 200 mL per gram of chitosan.

The reaction is typically carried out at room temperature and for a time period sufficient for the phosphate template molecule to bind to the chitosan. Generally, the reaction can be carried out for about 30 minutes to about 6 hours.

Once the phosphate template molecule is bound to the swollen polymer, the chitosan polymer is then cross-linked with a suitable crosslinking agent. Representative examples of suitable crosslinking agents include isocyanate crosslinking agents, aldehyde crosslinking agents and epoxide crosslinking agents. Suitable isocyanate crosslinking agents include aromatic, aliphatic and cycloaliphatic diisocyanates and triisocyanates. Representative examples of such isocyanate crosslinking agents include 2,4-toluene diisocyanate, m-phenylene diisocyanate, 4-chloro-1,3-phenylene diisocyanate, 3,3'-dimethyl-4,4'-diphenylene diisocyanate, 4,4'-diphenylene diisocyanate, xylene diisocyanate, 1,6-hexamethylene diisocyanate, 1,10-decamethylene diisocyanate, 1,4-cyclohexylene diisocyanate, 4,4'methylene bis(cyclohexyl isocyanate), 1,5-tetrahydronaphthalene diisocyanate, paraxylylene diisocyanate, durene diisocyante, 1,2,4-benzene diisocyanate, isoform diisocyanate, 1,4-tetramethylxylene diisocyanate, 1,5-naphthalene diisocyanate, and the like. Suitable aldehyde crosslinking agents include paraformaldehyde, paraldehyde, formaldehyde, acetaldehyde, glycolaldehyde, glyceraldehyde, hydroxymethyl glyceraldehyde, glyoxal and the like. Suitable epoxide crosslinking agents include methyl glycidyl methacrylate, methyl glycidyl acrylate, allyl glycidyl ether, allylphenol glycidyl ether, glycidyl methacrylate and the like.

In general, the weight percentage of cross-linker in the MIP compounds of the present invention ranges from about 5% to about 50%. In one embodiment, the weight percentage of cross-linking agent in the MIP compound is about 25% to about 35%.

If desired, a catalyst may be employed during the crosslinking step. Useful catalysts include amine catalysts such as N,N-Dimethylcyclohexylamine, tetramethylguanidine, tetramethylethylenediaminorietheylene diamine, tripropylene glycol, N,N'-dimethylpiperazine, N,N,N',N'-tetramethyl-1,3-butanediamine, trimethylpiperazine, 1,4-bis(2-hydroxylpropyl)-2-methylpiperazine, N-hydroxyethylpiperazine, 1,3,5-tris(dimethylaminopropyl) hexahydrostriazine, dimethylbenzylamine, 4-ethylmorpholine, 2,2-dimorpholinoethyl ether, triethylamine, 2,2'-bis(2-ethyl-2-azobicycloether), diazobicyclooctane, dimethylaminopropylamine, diethylaminoethylamine, and the like.

The crosslinking procedures and conditions which are used are conventional. The amounts of chitosan and crosslinking agents can vary broadly, depending on the specific nature/reactivities of the chitosan and crosslinking agent chosen as well as the specific application and environment in which the polymer will be ultimately employed. The solvent (if used), temperature and means of crosslinking can be varied in order to obtain polymeric materials of optimal physical or chemical features, for example, porosity, stability, and hydrophilicity. The solvent will also be chosen based on its ability to solubilize all the various components of the reaction mixture.

After crosslinking is complete, the target phosphate template molecule is removed from the cross-linked chitosan polymer to leaves a macroporous polymer with complementary molecular cavities which include moieties that have specific binding affinity for the target phosphate molecule with which the polymer was imprinted. The target phosphate template molecule is removed from the cross-linked chitosan polymer by one or more washing steps with a suitable organic solvent(s), such as methanol:triethylamine as the extraction solvent or methanol and diethyl ether alcohol. Alternatively, the target phosphate template molecule can be removed from the cross-linked chitosan polymer by one or more washing steps using water overnight in a Soxhlet apparatus, or with an ammonium hydroxide solution or a dilute sodium hydroxide solution. The resulting MIP may then be subjected to a drying step such as vacuum drying.

Figure 2:
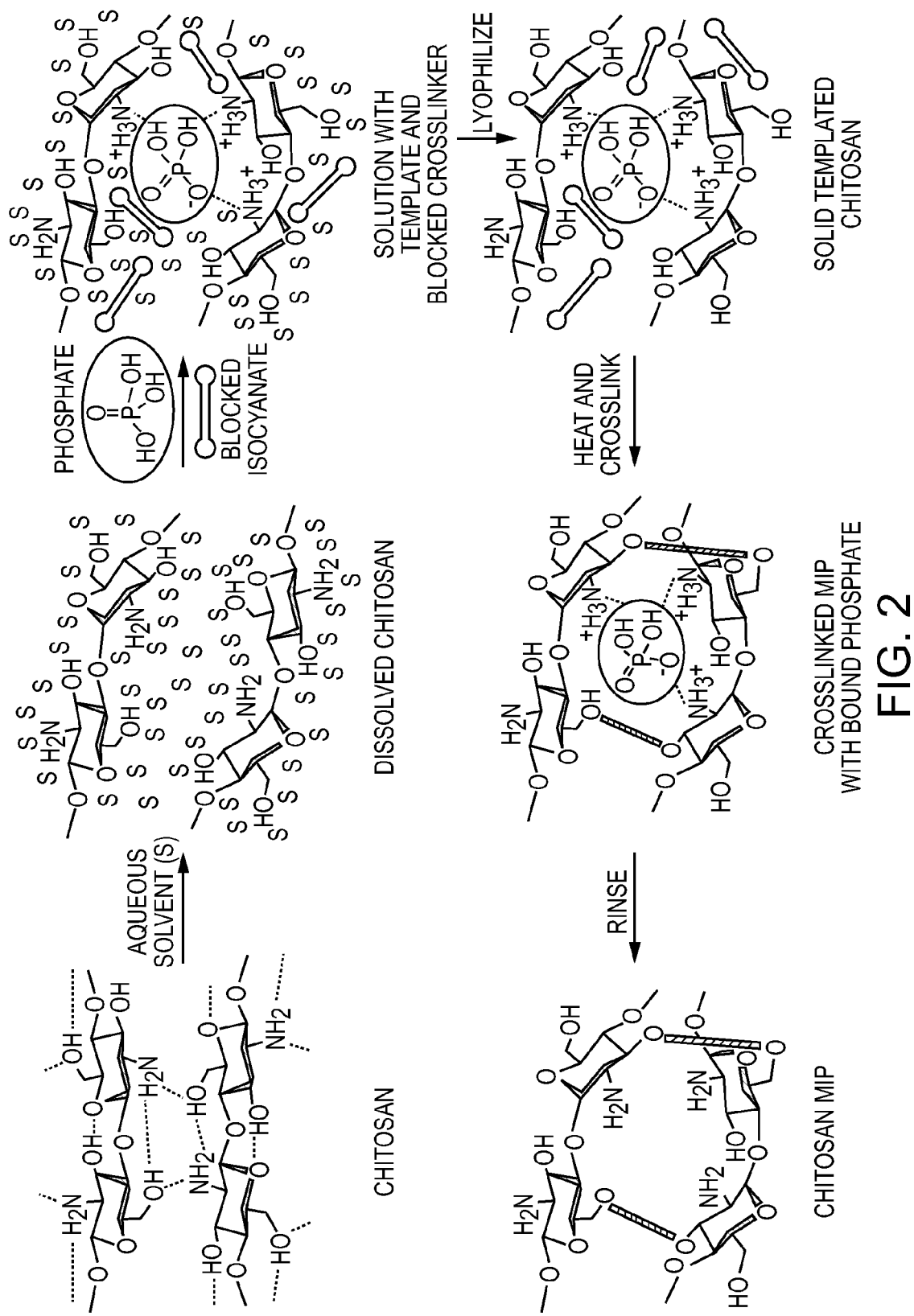
FIG. 2 illustrates a reaction scheme for preparing a cross-linked molecularly imprinted polymer according to another embodiment of the present invention.

In another embodiment, a process for preparing a cross-linked molecularly imprinted polymer of the present invention is generally shown in FIG. 2. In general, the process includes (a) providing an aqueous solution including at least chitosan, a phosphate template molecule and a blocked crosslinking agent in an aqueous solvent; (b) removing the aqueous solvent from the solution to form a solid; (c) heating the solid to a temperature sufficient to unblock the blocked crosslinking agent and form a cross-linked chitosan with the phosphate template molecule bound thereto; and (d) removing the phosphate template molecule to provide a cross-linked molecularly imprinted polymer comprising cross-linked chitosan having selective binding sites for phosphate ions, phosphate containing molecules, or a combination of both.

Step (a) includes providing an aqueous solution including at least chitosan, a phosphate template molecule and a blocked crosslinking agent in an aqueous solvent. Any of the phosphate template molecules disclosed above can be used herein. Useful aqueous solvents include water, diluted acetic acid, diluted hydrochloric acid and the like.

The blocked crosslinking agent can be any suitable blocked crosslinking agent. In one embodiment, the blocked crosslinking agent is a blocked isocyanate. As used herein, a "blocked isocyanate" refers to an isocyanate moiety where the hydrogen that would typically be bonded with the carbon of the isocyanate's carbonyl group has been replaced with another group that prevents that carbon from reacting until the desired stage in the process. The preferred blocked isocyanate has the formula:

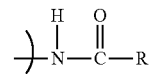

where R comprises a moiety that will separate from the compound when exposed to temperatures of at least about 40° C., and preferably from about 60° C. to about 80° C., after a time period of no more than about 24 hours, and preferably from about 1 hour to about 4 hours. In one embodiment, R is —SO$_3$Na and the isocyanate is hexamethylene diisocyanate. In general, the weight percentage of cross-linker in the MIP compounds of the present invention can be in the ranges discussed above.

Step (b) includes removing the aqueous solvent from the solution to form a solid. In one embodiment, the aqueous solution is lyophilized over a sufficient period of time to remove substantially all of the aqueous solvent and any other lyophilizable substances to provide a homogenous solid. A sufficient period of time will generally depends on the type of lyophilizer and the size of the sample to be lyophilized. In one embodiment, the time period can range from about 12 hours to about 36 hours.

Once the solid is formed, it is then heated to a temperature and time period sufficient to unblock the blocked crosslinking agent and form a cross-linked chitosan with the phosphate template molecule bound thereto. A suitable temperature will depend on the particular blocked crosslinking agent being used. In general, a sufficient temperature will be at least 40° C. and can range from about 40° C. to about 100° C. A sufficient period of time can range from about 1 hour to about 24 hours.

In general, the weight percentage of cross-linker in the MIP compounds of the present invention ranges from about 5% to about 50%. In one embodiment, the weight percentage of cross-linking agent in the MIP compound is about 25% to about 35%.

After crosslinking is complete, the target phosphate template molecule is removed from the cross-linked chitosan polymer to leaves a macroporous polymer with complementary molecular cavities which include moieties that have specific binding affinity for the target phosphate molecule with which the polymer was imprinted. The target phosphate template molecule is removed from the cross-linked chitosan polymer using the washing and drying steps as discussed above.

The cross-linked molecularly imprinted polymer of the present invention can be prepared in a wide variety of forms ranging from powders to beads to macro structures such as plates, rods, membranes or other materials. In one embodiment, the cross-linked molecularly imprinted polymer of the present invention is in the form of porous beads. Porous beads can have an open cell structure such that the majority of open volumes within the bead are interconnected with one another and external openings on surfaces of the bead. In one embodiment, the cross-linked molecularly imprinted polymer of the present invention can be in the form of macroporous beads. However, in some cases mesoporous or microporous beads can also be formed and can be useful for some applications. For example, depending on the target ions a microporous or mesoporous structure can be desirable as long as diffusion through the pores does not become a rate limiting step.

As used herein, the term "macroporous" refers to porous networks having average pore diameters of greater than 100 nm. The term "mesoporous" refers to porous networks having an average pore diameter from 10 nm to 100 nm. Similarly, the term "microporous" refers to porous networks having an average pore diameter less than 10 nm. The resin beads of the present invention typically have a permanent porous structure even in the dry state. Although the resins can swell when contacted with a solvent, swelling is not needed to allow access to the interior of the particles through the porous structure.

In general, the cross-linked molecularly imprinted polymer of the present invention may have an average particle size of from about 100 microns to about 1300 microns and preferably from about 300 microns to about 1000.

According to another aspect of the invention, the target phosphate ions are removed from an aqueous solution, collected, and reused in another application.

The cross-linked molecularly imprinted polymer of the present invention is particularly useful in removing phosphate contaminants from an aqueous medium, e.g., drinking water, lakes, streams, irrigation runoff, industrial effluent, mine waste, etc. The cross-linked molecularly imprinted polymer of the present invention resin can be utilized in a molecularly imprinted polymer ion exchange resin system where a plurality of the same or different polymers are employed. In one aspect, a plurality of cross-linked molecularly imprinted polymer types can be combined to treat a particular liquid. For example, a combination of lead imprinted beads and arsenate imprinted beads can be combined in a single treatment system with the cross-linked molecularly imprinted polymer of the present invention. Alternatively, a single resin material can be templated using multiple imprinting complexes. In this manner, more than one specific ion can be removed from the aqueous medium to provide a more efficient process. Generally, the liquid medium can be passed through a column or bed of the cross-linked molecularly imprinted polymer. A sufficient amount of the cross-linked molecularly imprinted polymers should be used to remove all of the undesirable phosphate ions using the method of this invention.

The following examples are provided to enable one skilled in the art to practice the invention and are merely illustrative of the invention. The examples should not be read as limiting the scope of the invention as defined in the claims.

EXAMPLE 1

Preparation of Phosphate-Imprinted Chitosan MIP—Organic Solvent

Commercial-grade chitosan powder was passed through a sieve to remove particles greater than 150 µm in diameter. Chitosan particles (1.0 g) were added to a solution of phenyl phosphonic acid (240 mg) dissolved in 1:1 methylene chloride:acetonitrile (50 mL). The swollen chitosan particles were stirred overnight to allow the organophosphate to bind to chitosan. The chitosan was filtered and washed with acetone and hexanes. The chitosan (500 mg) was cross-linked by adding a solution of acetonitrile (100 mL) containing hexamethylene diisocyanate crosslinker (1.8 mL) and tetramethylguanidine catalyst (115 mg). After stirring overnight, the chitosan was filtered and washed with acetonitrile. The organophosphate template was removed by Soxhlet extraction using 8:1 methanol:triethylamine as the extraction solvent. The chitosan was then washed with methanol and diethyl ether and was dried under vacuum.

EXAMPLE 2

Preparation of Phosphate-Imprinted Chitosan MIP—Aqueous Solvent

Commercial-grade chitosan powder (1.25 g) was added to 45 mL of acetic acid solution and mixed until a homogeneous solution was obtained. A separate solution was made containing 1.54 M monosodium phosphate and 0.2 M acetic acid. Bisulfate-blocked hexamethylene diisocyanate crosslinker (1.16 g) was dissolved in 5.0 mL of the phosphate/acetic acid solution. The crosslinker/phosphate/acetic acid solution was then added to the chitosan solution and mixed thoroughly. The combined mixture was poured into a petri dish or other suitable shallow container and was lyophilized to remove water. The freeze-dried chitosan was then placed in an oven and heated overnight at 60° C. to crosslink the chitosan and form a MIP. Phosphate template molecules were removed from the chitosan by Soxhlet extraction with aqueous ammonium hydroxide solution. After extraction, the MIP was washed with water until the pH of the filtrate was neutral. The MIP was then dried under vacuum to constant weight.

EXAMPLE 3

Removal of Phosphate Template Molecule from Cross-linked Chitosan MIPs

A chitosan MIP was prepared as described in Example 2 containing 70 weight percent chitosan and 30 weight percent crosslinker. After heating the lyophilized polymer to form a cross-linked MIP imprinted for phosphate ion, different extraction solvents were compared to determine the best approach for removing phosphate template ions from the MIP. A sample of the phosphate-containing chitosan MIP (70 mg) was washed under varying conditions as follows: (1) overnight Soxhlet extraction with distilled water; (2) overnight Soxhlet extraction with 7 M aqueous ammonium hydroxide solution; (3) stirring/shaking in 0.5 M aqueous sodium hydroxide solution for one hour. After washing, the chitosan samples were collected, dried, and analyzed for phosphorous content via optical emission spectroscopy. The sample extracted with water contained 0.425 weight percent phosphorous, the sample extracted with ammonium hydroxide contained 0.022 weight percent phosphorous, and the sample washed with sodium hydroxide contained 0.031% phosphorous. Therefore, washing chitosan MIPs with a basic solution greatly reduces the amount of residual phosphate in the polymer.

EXAMPLE 4

Phosphate Uptake Experiment

A chitosan MIP was prepared as described in Example 2 containing 70 weight percent chitosan and 30 weight percent crosslinker. A corresponding non-imprinted, cross-linked chitosan was prepared as described in Example 2 except that phosphate ion was not added to the mixture. A portion of each polymer (20 mg) was added to 1.0 M aqueous monosodium phosphate solution (10 mL) and stirred at room temperature for two hours. The chitosan polymer was then collected by filtration, washed with 2 mL of distilled water, and dried under vacuum. The phosphorous content of the MIP and the non-imprinted control polymer were analyzed using optical emission spectroscopy. The chitosan MIP absorbed 5.55 weight percent phosphorous while the control chitosan absorbed 3.95 weight percent phosphorous. Therefore, a 100 gram sample of the chitosan MIP will absorb 21 grams of phosphate ion, while 100 grams of the non-imprinted control polymer will absorb only 14 grams of phosphate ion.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

What is claimed is:

1. A cross-linked molecularly imprinted polymer comprising: cross-linked molecularly imprinted chitosan having complementary molecular cavities that have a selective binding affinity for phosphate ions, phosphate containing molecules, or a combination of both.

2. The cross-linked molecularly imprinted polymer of claim 1, wherein the chitosan is cross-linked with a cross-linking agent selected from the group consisting of an isocyanate crosslinking agent, an aldehyde crosslinking agent, an epoxide crosslinking agent and combinations thereof.

3. The cross-linked molecularly imprinted polymer of claim 2, wherein the isocyanate crosslinking agent is selected from the group consisting of 1,6-hexamethylene diisocyanate, 2,4-toluene diisocyanate, m-phenylene diisocyanate, 4-chloro-1,3-phenylene diisocyanate, 3,3'-dimethyl-4,4'-diphenylene diisocyanate, 4,4'-diphenylene diisocyanate, xylene diisocyanate, 1,10-decamethylene diisocyanate, 1,4-cyclohexylene diisocyanate, 4,4'methylene bis(cyclohexyl isocyanate), 1,5-tetrahydronaphthalene diisocyanate, paraxylylene diisocyanate, durene diisocyante, 1,2,4-benzene diisocyanate, isoform diisocyanate, 1,4-tetramethylxylene diisocyanate, 1,5-naphthalene diisocyanate and combinations thereof.

4. The cross-linked molecularly imprinted polymer of claim 2, wherein the aldehyde crosslinking agent is selected from the group consisting of paraformaldehyde, paraldehyde, formaldehyde, acetaldehyde, glycolaldehyde, glyceraldehyde, hydroxymethyl glyceraldehyde, glyoxal and combinations thereof.

5. The cross-linked molecularly imprinted polymer of claim 2, wherein the epoxide crosslinking agent is selected from the group consisting of methyl glycidyl methacrylate, methyl glycidyl acrylate, allyl glycidyl ether, allylphenol glycidyl ether, glycidyl methacrylate and combinations thereof.

6. The cross-linked molecularly imprinted polymer of claim 1, comprising about 50 wt % to about 95 wt % of the at least one cross-linker.

7. A process for preparing a cross-linked molecularly imprinted polymer, the process comprising (a) providing a reaction product of chitosan and a phosphate template molecule in a polar solvent; (b) crosslinking the reaction product of step (a) with a crosslinking agent; and (c) removing the phosphate template molecule to provide a cross-linked molecularly imprinted polymer comprising cross-linked chitosan having complementary molecular cavities that have a selective binding affinity for phosphate ions, phosphate containing molecules, or a combination of both.

8. The process of claim 7, wherein the polar solvent is selected from the group consisting of water, carboxylic acid polar solvents, halogenated hydrocarbon polar solvents, cyclic ether polar solvents, amide polar solvents, sulfoxide polar solvents and mixtures thereof.

9. The process of claim 7, wherein the polar solvent is selected from the group consisting of water, acetic acid, dichloromethane, tetrahydrofuran, dimethylformamide, acetonitrile, dimethyl sulfoxide and mixtures thereof.

10. The process of claim 7, wherein the phosphate template molecule is selected from the group consisting of phosphate, methyl phosphate, ethyl phosphate, phenyl phosphate, potassium dihydrogen phosphate, sodium dihydrogen phosphate and mixtures thereof.

11. The process of claim 7, wherein the cross-linking agent selected from the group consisting of an isocyanate crosslinking agent, an aldehyde crosslinking agent, an epoxide crosslinking agent and combinations thereof.

12. The process of claim 11, wherein the isocyanate crosslinking agent is selected from the group consisting of 1,6-hexamethylene diisocyanate, 2,4-toluene diisocyanate, m-phenylene diisocyanate, 4-chloro-1,3-phenylene diisocyanate, 3,3'-dimethyl-4,4'-diphenylene diisocyanate, 4,4'-diphenylene diisocyanate, xylene diisocyanate, 1,10-camethylene diisocyanate, 1,4-cyclohexylene diisocyanate, 4,4'methylene bis(cyclohexyl isocyanate), 1,5-tetrahydronaphthalene diisocyanate, paraxylylene diisocyanate, durene diisocyante, 1,2,4-benzene diisocyanate, isoform diisocyanate, 1,4-tetramethylxylene diisocyanate, 1,5 -naphthalene diisocyanate and combinations thereof.

13. The process of claim 11, wherein the aldehyde crosslinking agent is selected from the group consisting of paraformaldehyde, paraldehyde, formaldehyde, acetaldehyde, glycolaldehyde, glyceraldehyde, hydroxymethyl glyceraldehyde, glyoxal and combinations thereof.

14. The process of claim 11, wherein the epoxide crosslinking agent is selected from the group consisting of methyl glycidyl methacrylate, methyl glycidyl acrylate, allyl glycidyl ether, allylphenol glycidyl ether, glycidyl methacrylate and combinations thereof.

15. The process of claim 7, wherein the removing step comprises washing the cross-linked molecularly imprinted polymer one or more times.

16. A process for preparing a cross-linked molecularly imprinted polymer, the process comprising (a) providing an aqueous solution including at least chitosan, a phosphate template molecule and a blocked crosslinking agent in an aqueous solvent; (b) removing the aqueous solvent from the solution to form a solid; (c) heating the solid to a temperature sufficient to unblock the blocked crosslinking agent and form a cross-linked chitosan with the phosphate template molecule bound thereto; and (d) removing the phosphate template molecule to provide a cross-linked molecularly imprinted polymer comprising cross-linked chitosan having selective binding sites for phosphate ions, phosphate containing molecules, or a combination of both.

17. The method of claim 16, wherein the phosphate template molecule is selected from the group consisting of phosphate, methyl phosphate, ethyl phosphate, phenyl phosphate, potassium dihydrogen phosphate, sodium dihydrogen phosphate and mixtures thereof and the blocked crosslinking agent is a blocked isocyanate.

18. The method of claim 17, wherein the blocked isocyanate has the formula

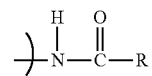

where R comprises a moiety that will separate from the compound when exposed to temperatures of at least about 40° C.

19. The process of claim 16, wherein the step of removing the aqueous solvent from the aqueous solution to form a solid comprises lyophilizing the aqueous solution.

20. The process of claim 16, wherein the step of heating the solid comprises heating the solid to a temperature of from about 40° C. to about 100° C.

21. The process of claim 16, wherein the removing step comprises washing the cross-linked molecularly imprinted polymer one or more times.

* * * * *